United States Patent [19]
Murata et al.

[11] Patent Number: 5,686,905
[45] Date of Patent: Nov. 11, 1997

[54] INPUT/OUTPUT SWITCHING APPARATUS HAVING VIRTUAL CONTROL

[75] Inventors: Yasuhiro Murata; Michio Mita, both of Kanagawa, Japan

[73] Assignee: Sony Corporation, Tokyo, Japan

[21] Appl. No.: 404,955

[22] Filed: Mar. 16, 1995

[30] Foreign Application Priority Data

Mar. 19, 1994 [JP] Japan ................... 6-074025

[51] Int. Cl.$^6$ ............... H04Q 1/00; H04Q 3/00
[52] U.S. Cl. ............... 340/825.79; 340/825.83; 340/826; 370/254; 370/363; 370/386; 379/242; 379/268; 379/271
[58] Field of Search ............... 307/115; 340/825.03, 340/825.79, 825.8, 825.83, 826; 370/53, 54, 60, 65; 379/242, 268, 271, 292, 335, 254, 363, 371, 374, 386, 387, 388

[56] References Cited

U.S. PATENT DOCUMENTS 5,072,217  12/1991  Georgiou et al. ........... 340/825.79
5,243,334   9/1993  Georgiou et al. ........... 340/825.03
5,343,193   8/1994  Shoda et al. ............... 340/825.79

FOREIGN PATENT DOCUMENTS

64-37175  2/1989  Japan.
92/09176  5/1992  WIPO ............... 340/825.79

*Primary Examiner*—Michael Horabik
*Assistant Examiner*—William H. Wilson, Jr.
*Attorney, Agent, or Firm*—William S. Frommer; Alvin Sinderbrand

[57] ABSTRACT

An input/output switching apparatus which can construct the system more flexibly as compared with the conventional system. The input/output switching apparatus is configured so that a user can manage the connection state of a physically-existing switching unit as the connection state of a virtual switching unit which corresponds to the physically-existing switching unit. Thus, the user can control the physical switching unit merely by operating the virtual switching unit which is constructed so as to be convenient for operation.

7 Claims, 8 Drawing Sheets

○ : INPUT TERMINAL
⌀ : OUTPUT TERMINAL

| Z \ X | 1 | 2 | 3 | ------ |
|---|---|---|---|---|
| 1 | $x_1, z_2$ | $x_2, z_2$ | $x_3, z_2$ | |
| 2 | $x_1, z_1$ | $x_2, z_1$ | $x_3, z_1$ | |
| 3 | $x_1, z_3$ | $x_2, z_3$ | $x_5, z_3$ | |
| ⋮ | | | | |

FIG. 3

| Z \ Y | 1 | 2 | 3 | ------ |
|---|---|---|---|---|
| 1 | $y_1, z_2$ | $y_2, z_2$ | $y_3, z_2$ | |
| 2 | $y_1, z_1$ | $y_2, z_1$ | $y_3, z_1$ | |
| 3 | $y_1, z_3$ | $y_2, z_3$ | $y_6, z_3$ | |
| ⋮ | | | | |

○ : INPUT TERMINAL
    OUTPUT TERMINAL

FIG. 11B

INPUT/OUTPUT SWITCHING APPARATUS HAVING VIRTUAL CONTROL

BACKGROUND OF THE INVENTION

1. Field of the Invention

The present invention relates to an input/output switching apparatus and a matrix switcher control apparatus, which are applicable to a switcher and its control apparatus used in editing of, for example, video signal and the like.

2. Description of the Related Art

A switcher is widely used as an apparatus for switching and outputting a plurality of signals (a video signal, an audio signal, a time code signal, other control signal, etc.) to a plurality of output destinations at the time of editing. In the switcher, crosspoints of input lines and output lines are arranged in the form of matrix so that it is possible to switch the output destinations of the input signals or simultaneously distribute the input signals to a plurality of output lines in accordance with a user's instruction.

However, when a system is constituted by a plurality of such matrix switchers, there has been a problem that the selection range or the degree of freedom of terminal arrangement is so narrow to thereby make the system design difficult. For example, when a switcher system is constituted by piling a matrix switcher of a video system having sixty-four input terminals and sixty-four output terminals and a matrix switcher of an audio system having thirty-two input terminals and thirty-two output terminals, there arises a problem that pairs of input and output terminals for video and audio signals must be allotted to connected to thirty-two pairs of terminals, so that the selection range or the degree of freedom of the terminal arrangement is limited, thereby it makes the system design difficult.

In order to widen the selection range or improve the degree of freedom of the terminal arrangement, it is considered that a matrix switcher providing sixty-four input terminals and sixty-four output terminals at the maximum is used as the matrix switcher of the audio system. In this case, however, there arises another problem that there are many input and output terminals and crosspoints which are not used.

Further, when a component video signal and a composite video signal are to be controlled separately by two-layered matrix switchers, it is possible to control by two small-scale matrix switchers each of which has eight input terminals and eight output terminals. In contrast, when the component video signal and the composite video signal are to be controlled simultaneously by two-layered matrix switchers, it is required to use two matrix switchers, for example, each of which has sixteen input terminals and sixteen output terminals. Also in this case, there is a problem that there are many terminals and crosspoints which are not used.

SUMMARY OF THE INVENTION

In view of the foregoing, an object of this invention is to provide an input/output switching apparatus in which the system can be structured flexibly and the terminals can be used effectively as compared with the conventional system.

The foregoing object and other objects of the invention have been achieved by the provision of an input/output switching apparatus, comprising: virtual information inputting means for inputting virtual information to switch and control physically-existing matrix switching means in accordance with virtual piling information, virtual input information, and virtual output information; and conversion means for converting these virtual informations into physical informations.

Further, according to this invention, the input/output switching apparatus comprises virtual information inputting means for inputting virtual piling information, virtual input information, and virtual output information; conversion means for converting the virtual piling information, the virtual input information, and the virtual output information into physical piling information, physical input information, and physical output information, respectively; and a plurality of matrix switching means each providing a plurality of input terminals and output terminals, for keeping different physical piling information, respectively, wherein the plurality of matrix switching means converts input terminals and output terminals to be selected based on the physical input information and the physical output information when the physical piling information supplied from the conversion means corresponds with the physical piling which is kept in the plurality of matrix switching means.

Further, according to the present invention, a matrix switcher control apparatus comprises: a first conversion table for converting virtual piling information, virtual input information supplied from virtual information inputting means, which inputs the virtual piling information, the virtual input information, and virtual output information, into physical piling information and physical input information; a second conversion table for converting the virtual piling information and the virtual output information supplied from the virtual information input means into the physical piling information and physical output information; and control means for supplying the physical piling information, the physical input information, and the physical output information obtained via the first conversion table and the second conversion table to a plurality of matrix switching means which respectively provide a plurality of input terminals and output terminals, and which respectively keeps different physical piling information.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Virtual matrix space

In order that the user can easily control a matrix switcher, a notion of a virtual matrix space is used here. The virtual matrix space is composed of logical crosspoints, which are logical existences, arranged in the form of a three-dimensional lattice. The term "three dimensions" means that the dimension corresponding to the number of matrix switchers is added to the two dimensions of the input and output. Each dimension is logical existence. In this embodiment, the crosspoints of a physical matrix switcher are made to correspond to the crosspoints of a virtual matrix space so that the system configuration can be constructed flexibly and effectively.

(2) Virtual matrix space control system (2-1) Outline

It is considered that the system having very good usability for the user can be constructed if crosspoints on a virtual matrix space properly constructed in a system are operated without being conscious of physical crosspoints. In order to realize such a system, according to this embodiment, there is provided a conversion function which converts positional information of the crosspoints on the virtual matrix space into positional information of the physical crosspoints. This conversion function is included in a system configuration management unit which is described in the next item. The system configuration management unit also includes a reverse conversion function which converts the positional information of the physical crosspoints into the positional information of the crosspoints on the virtual matrix space in order to inform the control results of the physical crosspoints to the user.

(2-2) Construction of matrix switcher system

Figure 1:
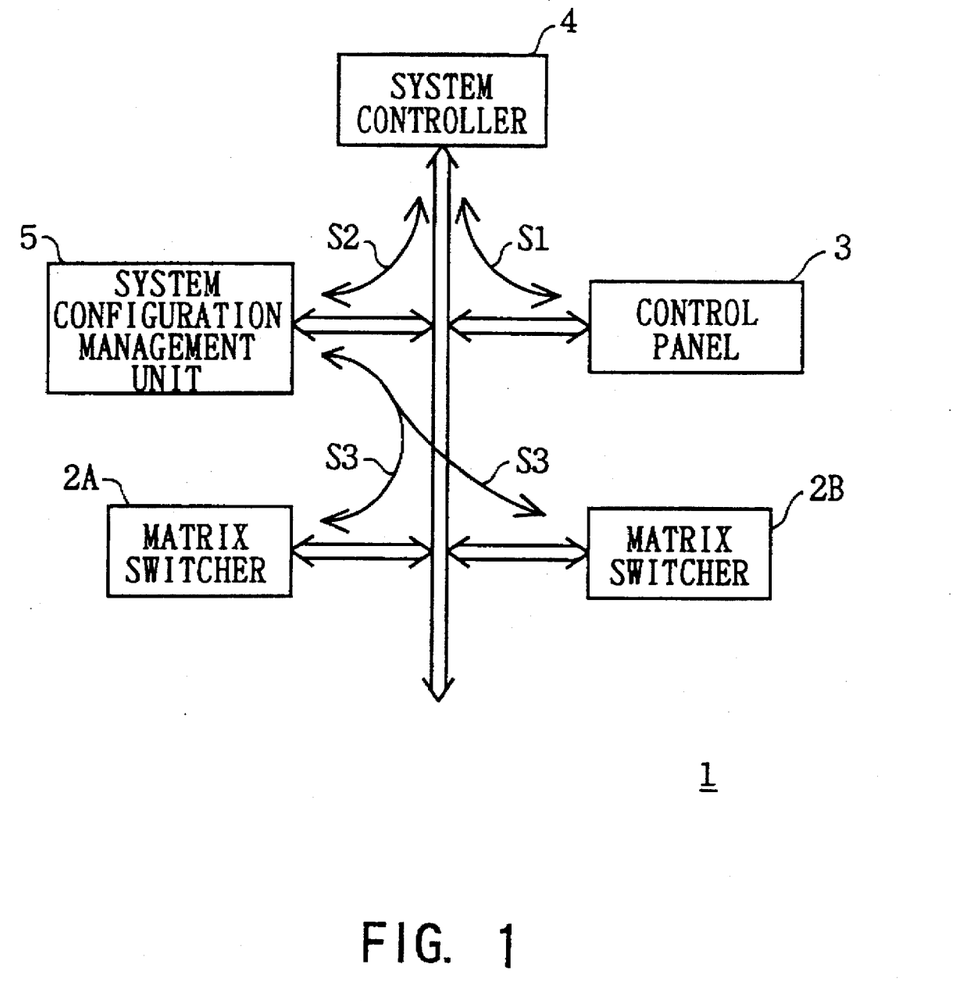
FIG. 1 is a block diagram showing an example of system configuration of the input/output switching apparatus according to the present invention.

FIG. 1 shows an example of construction of a matrix switcher system 1 providing the management function. The matrix switcher system 1 is composed of matrix switchers 2A and 2B, a control panel 3 for instructing conversion on the matrix space which is virtually constructed, and a system controller 4 and a system configuration management unit 5 for converting the virtual crosspoint information input to the control panel 3 into the physical crosspoint information.

Here, the control panel 3 is used for inputting a virtual piling information "Z", a virtual input information "Y", and a virtual output information "X" which are connection information on the virtual matrix space. Also, the control panel 3 is used for informing to the user by lightening of a lamp whether or not the matrix switcher 2A or 2B is actually switched based on the connection information on the virtual matrix space.

The system controller 4 outputs a switching signal S1 composed of the virtual piling information "Z" and so on input via the control panel 3 to the system configuration management unit 5, and simultaneously transfers to the control panel 3 a response signal S2 responding to the switching signal S1 input from the system configuration management unit 5.

Further, the system configuration management unit 5 allocated between the system controller 4 and the matrix switchers 2A and 2B is functioned as means for corresponding the crosspoint on the virtual matrix space and the crosspoint of the matrix switchers 2A and 2B.

Incidentally, the corresponding operation mentioned here is the conversion operation that the virtual piling information "Z", the virtual input information "Y", and the virtual output information "X" are converted into a physical piling information "z", a physical input information "y", and a physical output information "z" which comprises switching signal S3 from the matrix switchers 2A and 2B, and its reverse conversion operation.

More specifically, the system configuration management unit 5 converts the positional information of the crosspoint on the virtual matrix space which is designated by the user into the positional information of the physical crosspoint, and outputs it to the matrix switcher 2A and 2B. Simultaneously, the system configuration management unit 5 reversely converts the positional information of the crosspoint on the physical matrix space after conversion which is sent back from the matrix switchers 2A and 2B into the positional information of the crosspoint on the virtual matrix space, and sends back it to the system controller 4.

In this manner, the system is constructed so that the user can switch the crosspoints of the physically-existing matrix switcher by inputting an instruction via the control panel 3 so as to switch the crosspoints on the virtual matrix space without being conscious of physical crosspoints. Further, the user can recognize the switching state of the physically-existing matrix switcher on the control panel 3 as the switching state of the virtual matrix switcher.

The inner construction of the system configuration management unit 5 described above is shown in FIG. 2 in detail. The system configuration management unit 5 is mainly composed of a control circuit 5A, in which the response signal S2 and the switching signal S3 are transmitted and received via an I/O interface unit 5B.

Figure 2:
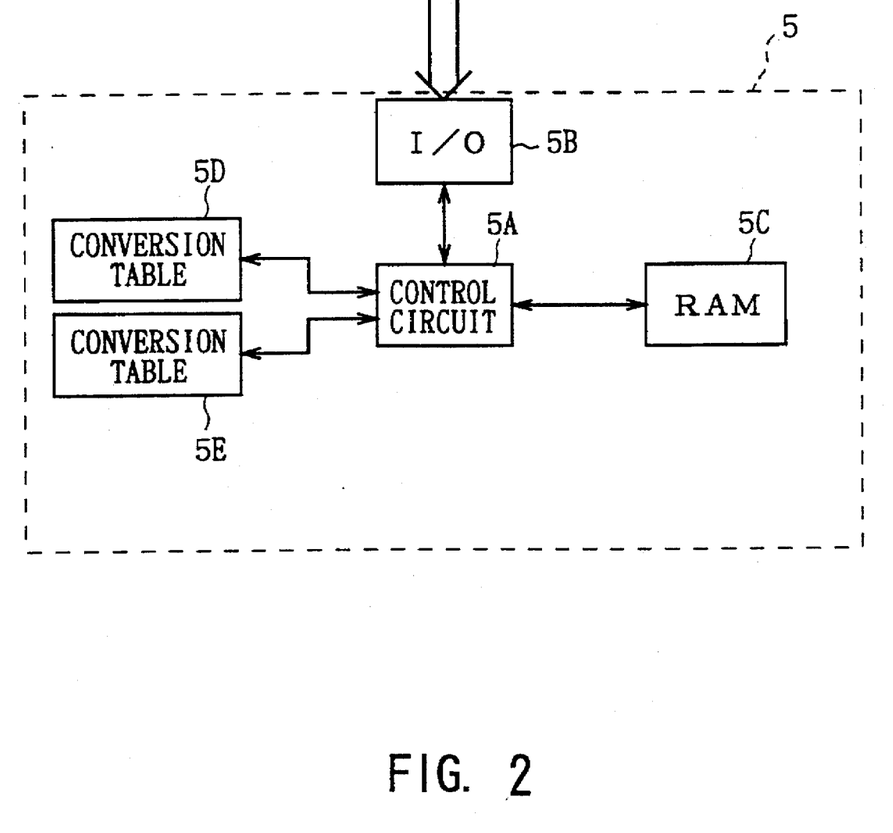
FIG. 2 is a block diagram showing an example of system configuration management unit.

It is a RAM (random access memory) 5C that is used for storing the data transmitted and received via the I/O interface unit 5B. RAM 5C stores the virtual informations such as the virtual piling information "Z" received via the I/O interface unit 5B, and the physical informations such as the physical piling information "z" transmitted via the I/O interface unit 5B.

When the virtual piling information "Z" and the like is stored in RAM 5C, the control circuit 5A expands it to the combination of the virtual piling information "Z" and the virtual input information "Y" so as to convert into the physical information, and expands to the combination of the virtual piling information "Z" and the virtual output information "X" to verify two conversion tables, 5D and 5E.

Figure 3:
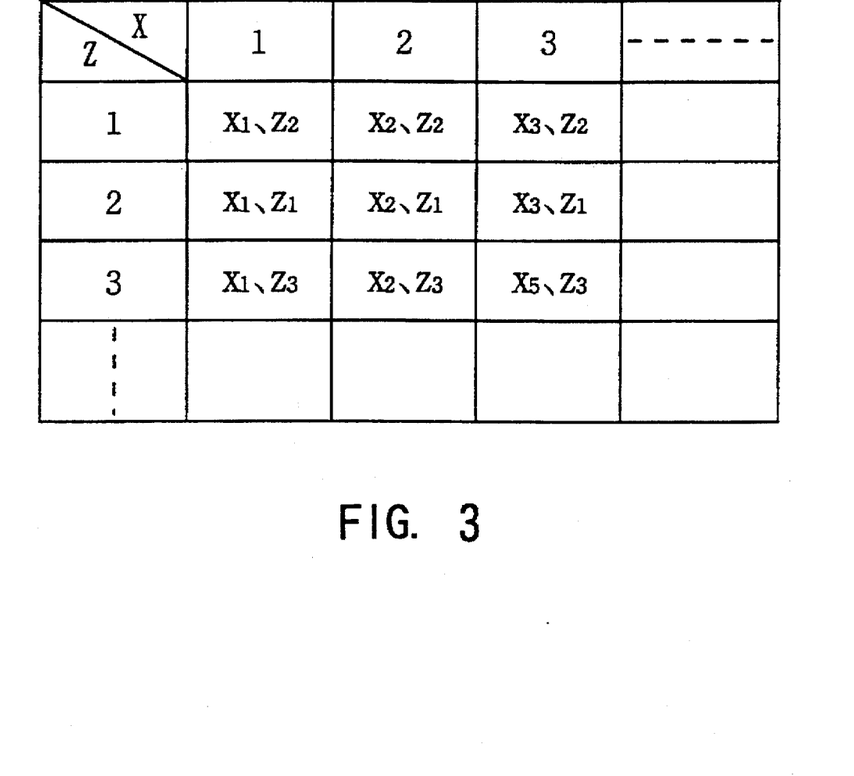
FIG. 3 is a schematic diagram showing an embodiment of the second conversion table.
Figure 4:
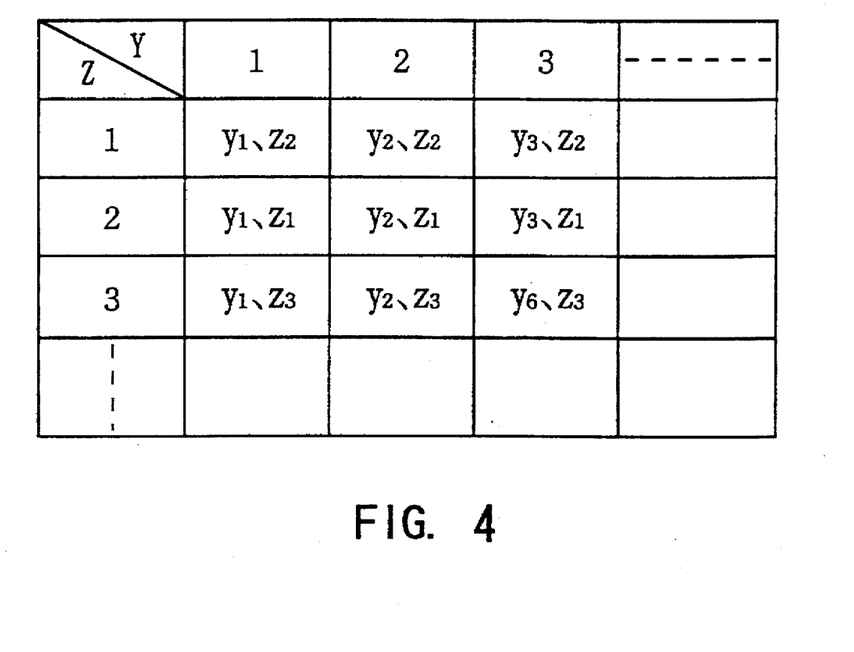
FIG. 4 is a schematic diagram showing an embodiment of the first conversion table.

The conversion table 5D is a table for converting the virtual piling information "Z" and the virtual output information "X" into the physical piling information "z" and the physical output information "x", and is constructed as shown in FIG. 3. The conversion table 5E is a table for converting the virtual piling information "Z" and the virtual input information "Y" into the physical piling information "z" and the physical input information "y", and is constructed as shown in FIG. 4.

The embodiment of conversion operation using two conversion tables 5D and 5E is as follows, referring to FIGS. 3 and 4. If "1" is input as the virtual piling information "Z" and "1" and "2" are input as the virtual output information "X" and the virtual input information "Y" respectively, the control circuit 5A expands the virtual information composed of three parameters to the combination of the virtual piling information "Z" and the virtual output information "X", "1, 1", and the combination of the virtual piling information "Z" and the virtual input information "Y", "1, 2" to convert to the combination of the physical piling information "z" and the physical output information "x", "2, 1", and the physical piling information "z" and the physical input information "y", "2, 2".

In this manner, when two combinations of physical information are obtained, the control circuit 5A confirms the physical piling information "z" in every combinations is corresponding, and then reconstitutes the physical piling information "z", the physical output information "x", and the physical input information "y" which are output as the switching signal S3. As a result, "2, 1, 2" are stored in RAM 5C as the physical piling information "z", the physical output information "x", and the physical input information "y".

Figure 5:
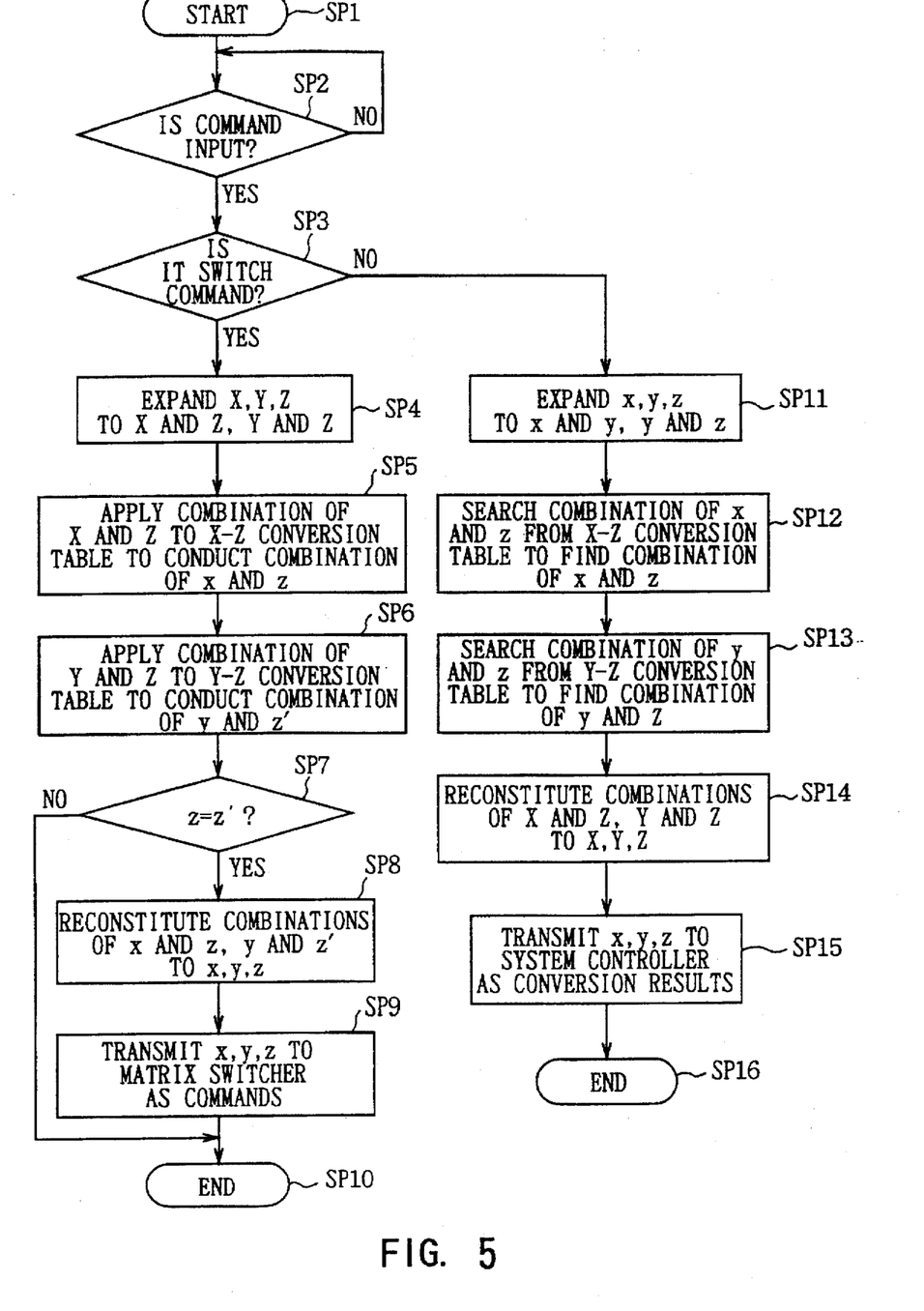
FIG. 5 is a flowchart showing an example of processing procedure executed in the system configuration management unit.

The description will be made as to processing procedure executed in the system configuration management unit 5. The control circuit 5A starts processing from step SP1, and judges whether or not the command is input via the I/O interface unit 5B at step SP2. While a negative result is being obtained, the control circuit 5A repeats the judgment processing and wait for the input of command. When the command is input and an affirmative result is obtained, the control circuit 5A proceeds to step SP3 to judge whether or not it is the conversion command input from the control panel 3.

If an affirmative result is obtained here, the control circuit 5A proceeds to step SP4 to expand the virtual piling information "Z", the virtual input information "Y", and the virtual output information "X" to the combination of the virtual piling information "Z" and the virtual output information "X" and the combination of the virtual piling information "Z" and the virtual input information "Y".

When the expansion processing is finished, the processing proceeds to the next step SP5, and the conversion table 5D for X-Z conversion is applied the combination of the virtual piling information "Z" and the virtual output information "X" to conduct the combination of the physical piling information "z" and the physical output information "x".

When the above processing is finished, at the next step SP6, the conversion table 5E for Y-Z conversion is applied the combination of the virtual piling information "Z" and the virtual input information "Y" to conduct the combination of the physical piling information "z'" and the physical input information "y".

In this manner, when conversion processings by the conversion tables 5D and 5E are finished, the control circuit 5A proceeds to step SP7 to judge whether or not the physical piling informations "z" and "z'" obtained from the conversion tables 5D and 5E are corresponding with each other.

This is because, if the physical piling informations are not corresponding, the matrix switcher to which the signal is input and the matrix switcher from which the signal is output are different from each other. It means that physical conversion operation can not be executed actually.

When an affirmative result is obtained at step SP7, which means that it is confirmed that the conversion result is not contradictory, the control circuit 5A proceeds to step SP8 to reconstitute from two combinations of physical information, (x, z) and (y, z') obtained by the conversion tables 5D and 5E to the physical piling information "z", the physical output information "y", and the physical input information "x".

After that, the control circuit 5A outputs the physical piling information "z", the physical output information "y", and the physical input information "x" via the bus to the matrix switchers 2A and 2B, and terminates the processings at step SP10.

On the other hand, if a negative result is obtained at step SP7, which means that any control objects to be actually controlled does not exist, the control circuit 5A directly proceeds to step SP10 to terminate the processings.

The processings described above are the processings in the case where an affirmative result is obtained at step SP3. On the contrary, if a negative result is obtained at step SP3, the control circuit 5A regards as the response signal responding to the conversion result is input from the matrix switcher 2A or 2B, thereby proceeds to step SP11. At step SP11, the control circuit 5A expands the physical piling information "z", the physical output information "y", and the physical input information "x", which are input from the matrix switchers actually connected, to two combinations of physical information, and then proceeds to step SP12.

At step SP12, the control circuit 5A converts the combination of the physical input information "x" and the physical piling information "z" obtained at previous step SP11 into the combination of the virtual input information "X" and the virtual piling information "Z" by reverse conversion processing in utilizing the conversion table 5D.

When this processing terminates, at the next step SP13, the control circuit 5A executes reverse conversion processing in utilizing the conversion table 5E to obtain the combination of the virtual output information "Y" and the virtual piling information "Z" corresponding to the combination of the physical output information "y" and the physical piling information "z".

When the conversion operation for each combination is finished, the control circuit 5A proceeds to step SP14 to reconstitute the virtual piling information "Z", the virtual output information "Y", and the virtual input information "X" which designate the crosspoint on the virtual matrix space.

After that, the control circuit 5A proceeds to step SP15 to output reconstituted virtual information via the I/O interface unit 5B to the system controller 4, and terminates the processings.

Incidentally, this virtual information is transferred via the system controller 4 to the control panel 3 to lighten the lamp and so on of the control panel 3.

Figure 6:
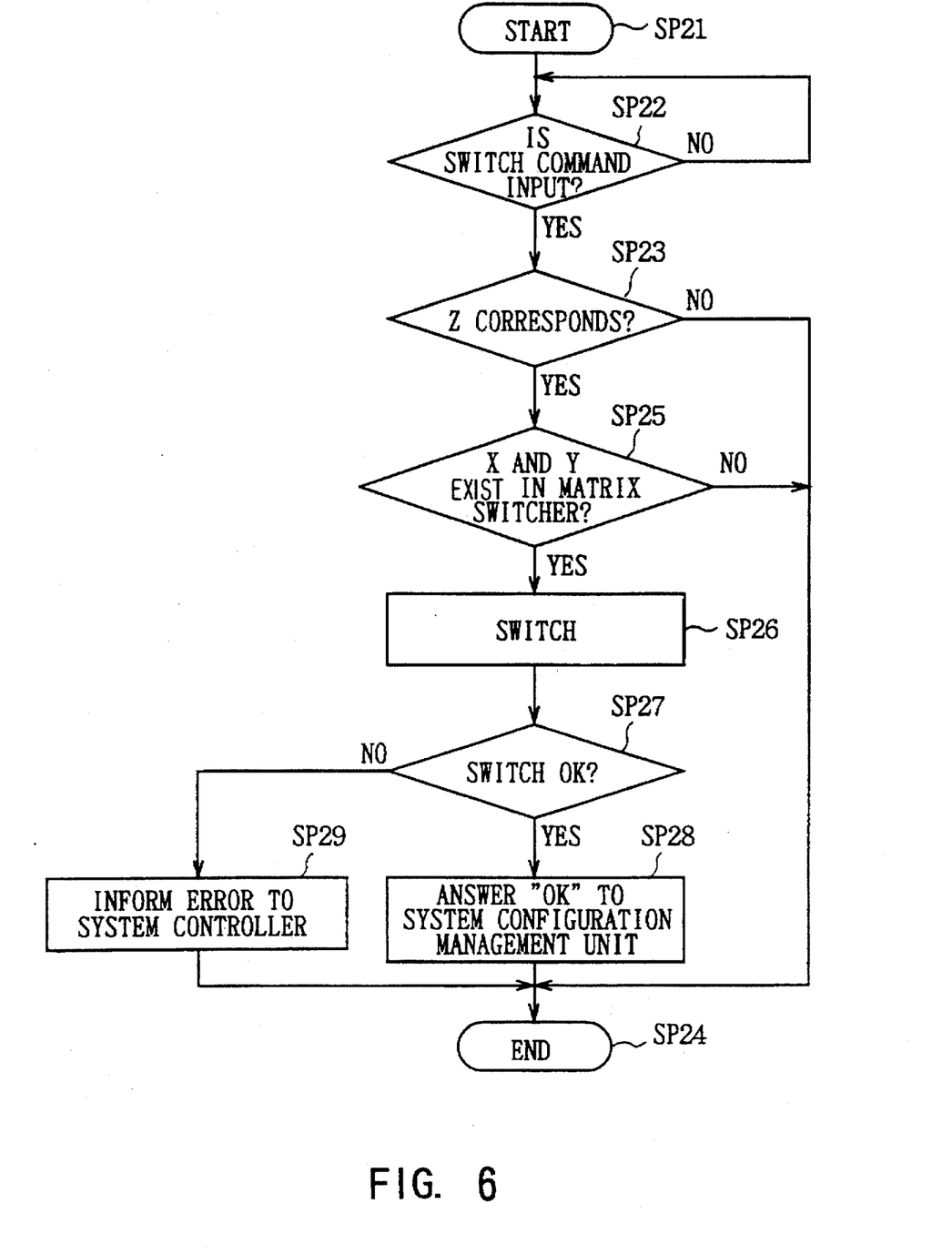
FIG. 6 is a flowchart showing an example of processing procedure executed in the matrix switcher.

The processing procedure to be executed in the matrix switchers 2A and 2B will be described using FIG. 6. The matrix switchers 2A and 2B start processing from step SP21, and then proceeds to step SP22 to judge whether or not the switch command is input from the system configuration management unit 5.

The matrix switchers 2A and 2B repeat this judgment processing till obtaining the affirmative result. When confirming the input of switch command, the matrix switchers 2A and 2B proceeds to step SP23 to judge whether or not the physical piling information "z" corresponds with each piling information. Incidentally, each matrix switcher 2A and 2B keeps respective piling informations which are different from each other.

If a negative result is obtained here, the matrix switcher 2A or 2B judges that the switch command is sent to the other switcher, and proceed to step SP24 to terminate all switch operation. Then, the matrix switchers 2A and 2B are in the state of waiting next switch command.

On the other hand, an affirmative result is obtained at step SP23, the matrix switcher 2A or 2B judges that the switch command is sent to itself, and proceeds to step SP25. At step SP25, the matrix switcher 2A or 2B judges whether or not the crosspoint corresponding to input physical input information "y" and physical output information "x" is existing in itself.

If a negative result is obtained here, the matrix switchers 2A and 2B judge that there is no crosspoint to be switched, and proceed to step SP24.

On the contrary, if an affirmative result is obtained at step SP25, the matrix switchers 2A and 2B proceed to step SP26 to execute switching operation, and, at next step SP27, judge whether or not the crosspoint is actually switched.

If an affirmative result is obtained, the matrix switchers 2A and 2B proceed to step SP28 to inform complication of the switch processing to the system configuration management unit 5, and prepare for next input of the switch command.

On the other hand, if a negative result is obtained, the matrix switchers 2A and 2B proceed to step SP29 to inform error of the switch processing to the system controller 4. Through these processings, the matrix switchers 2A and 2B operate.

(3) Mechanism of Conversion Control (3-1) Correspondence between physical space and virtual matrix space The description will be visually made as to conversion processing of the virtual information to the physical information by aforementioned system configuration management unit 5 with using three-dimensional model.

Figure 7:
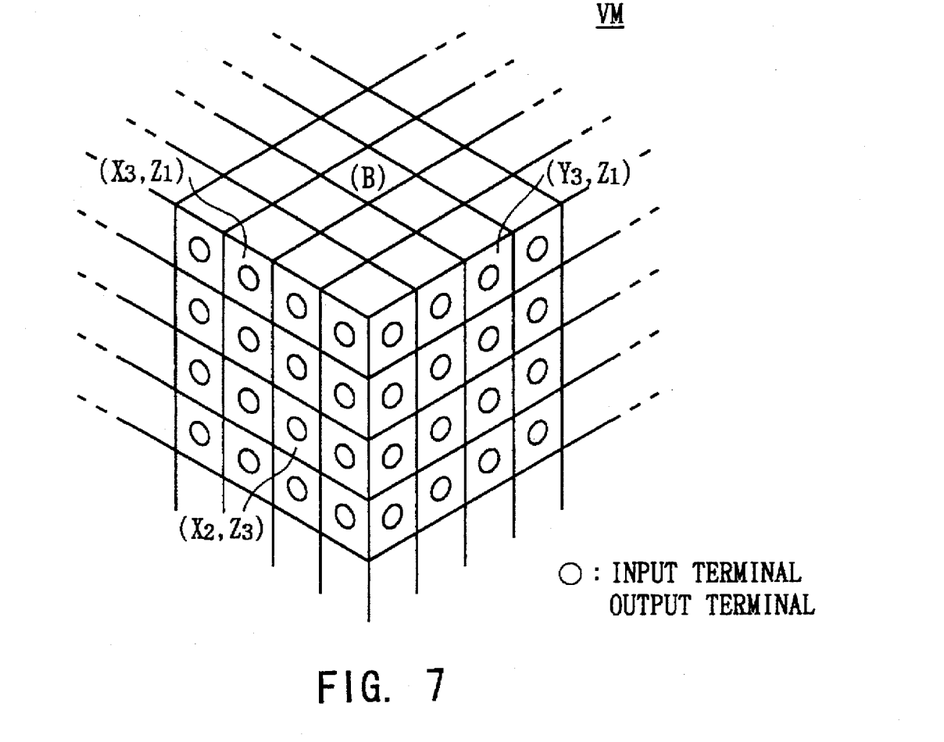
FIG. 7 is a schematic perspective diagram explaining a model of the virtual matrix space.
Figure 8:
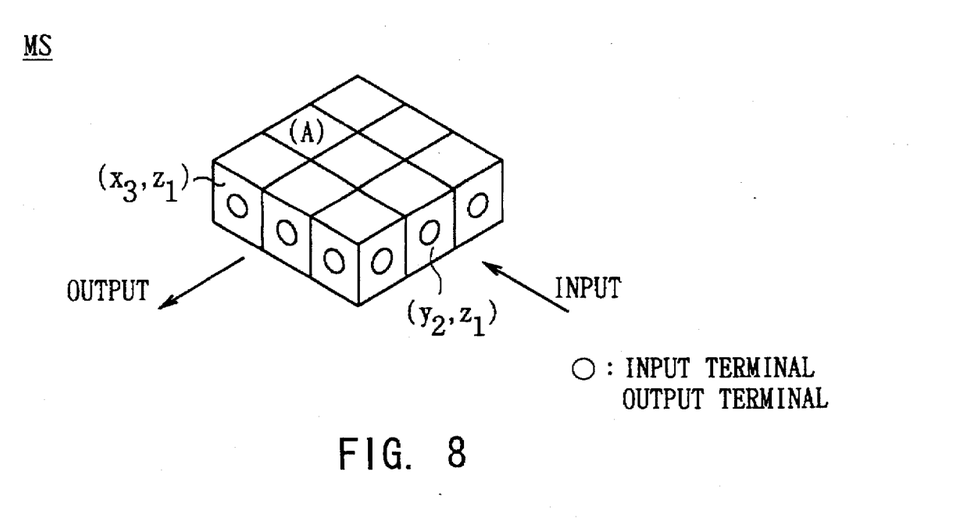
FIG. 8 is a schematic perspective diagram explaining a model of the physically-existing matrix switcher.
Figure 9:
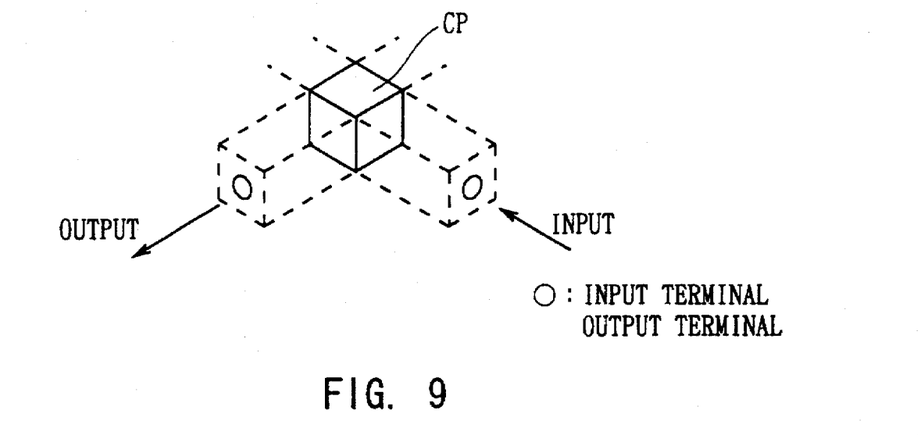
FIG. 9 is a schematic perspective diagram showing an model of a crosspoint.

FIG. 7 is used as a model of the virtual matrix space VM, and FIG. 8 is used as a model of physically-existing matrix switcher MS. Incidentally, FIG. 9 shows a model of crosspoint CP constructing the matrix switcher.

As described above, the correspondence between the crosspoints on the virtual matrix space (FIG. 7) and the crosspoints of the matrix switcher (FIG. 8) is set in the system configuration management unit 5 as the conversion tables 5D and 5E.

For example, an input terminal $(Y_3, Z_1)$ on the virtual matrix space VM shown in FIG. 7 corresponds with an input terminal $(y_2, z_1)$ of the matrix switcher MS shown in FIG. 8, and an output terminal $(X_2, Z_3)$ on the virtual matrix space VM shown in FIG. 7 corresponds with an output terminal $(x_3, z_1)$ of the matrix switcher MS shown in FIG. 8.

In such correspondence, however, a crosspoint of the input terminal $(y_2, z_1)$ and the output terminal $(x_3, z_1)$ of the matrix switcher MS exists physically, whereas a crosspoint of the input terminal $(Y_3, Z_1)$ and the output terminal $(X_2, Z_3)$ on the virtual matrix space VM does not exist because these terminals are different in the piling level. Accordingly, the output terminal $(x_3, z_1)$ of the matrix switcher MS is made to correspond with the output terminal $(X_3, Z_3)$ on the virtual matrix space VM, so that it is used that a physical crosspoint "A" is made to correspond with a crosspoint "B" on the virtual matrix space.

(3-2) Application Examples

Examples of such correspondence are shown in FIGS. 10A, 10B, 11A and 11B.

Figure 10A:
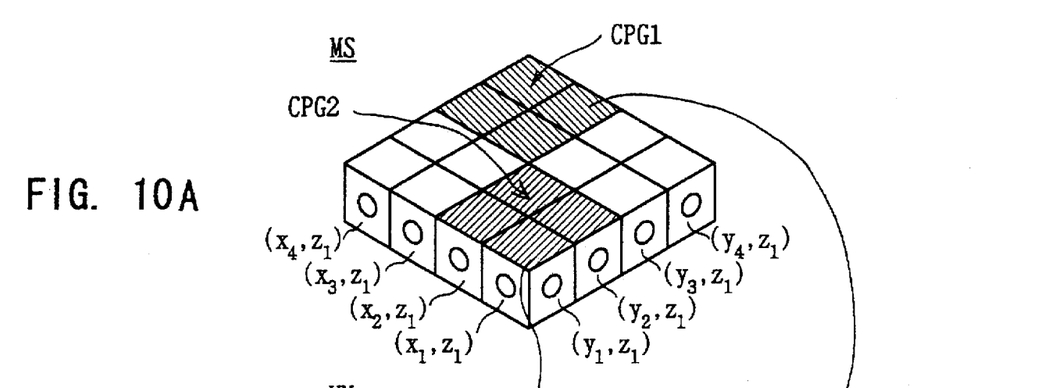
FIGS. 10A and 10B are schematic perspective diagrams explaining the case where a single matrix switcher is virtually treated as if it is constituted by two matrix switchers piled on each other.
Figure 10B:
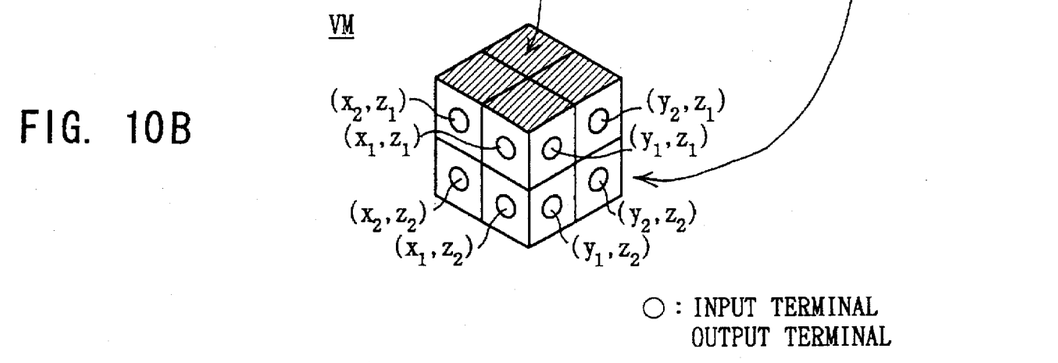

First, description will be made as to the case where one matrix switcher shown in FIG. 10A is made to operate virtually as two layers of matrix switcher as shown in FIG. 10B. In this case, input terminals $(y_1, z_1)$, $(y_2, z_1)$, $(y_3, z_1)$, $(y_4, z_1)$ and output terminals $(x_1, z_1)$, $(x_2, z_1)$, $(x_3, z_1)$, $(x_4, z_1)$ of the matrix switcher MS are respectively made to correspond with input terminals $(Y_1, Z_1)$, $(Y_2, Z_1)$, $(Y_1, Z_2)$, $(Y_2, Z_2)$ and output terminals $(X_1, Z_1)$, $(Z_2, Z_1)$, $(X_1, Z_2)$, $(X_2, Z_2)$ by the system configuration management unit 5.

As a consequence, it becomes possible to realize a construction of the matrix switchers in which the first crosspoint group CPG1 (four crosspoints connecting the input terminals $(y_3, z_1)$, $(y_4, z_1)$ and the output terminals $(x_3, z_1)$, $(x_4, z_1)$) and the second crosspoint group CPG2 (four crosspoints connecting the input terminals $(y_1, z_1)$, $(y_2, z_1)$ and the output terminals $(x_1, z_1)$, $(x_2, z_1)$).

In this manner, since a matrix switcher of a physically single-layered structure can be used as if it is a virtually two-layered structure, a user can use the system, for example, in such a manner that a component video signal is controlled by the virtual matrix switcher of the upper layer and a composite video signal is controlled by the virtual matrix switcher of the lower layer, without being conscious of the physical connection state.

Similarly, it is also possible to use single matrix switcher as a virtual matrix switcher of three or more layers. In this case, for example, the system may be used in such a manner that a digital video signal of the high definition television standard is allotted to the virtual matrix switcher of the third layer.

In the case where, for example, eight input terminals and eight output terminals are required for switching a component video signal and a composite video signal, it has been necessary in the conventional system to prepare two matrix switchers each having sixteen input terminals and sixteen output terminals as physically required video matrix switchers. In contrast, in this case, when the aforesaid conversion function of the embodiment is employed, only one matrix switcher having sixteen input terminals and sixteen output terminals is required. Thus, it is possible to remarkably reduce the number of the input and output terminals and crosspoints which are not used as compared with the conventional system.

Figure 11A:
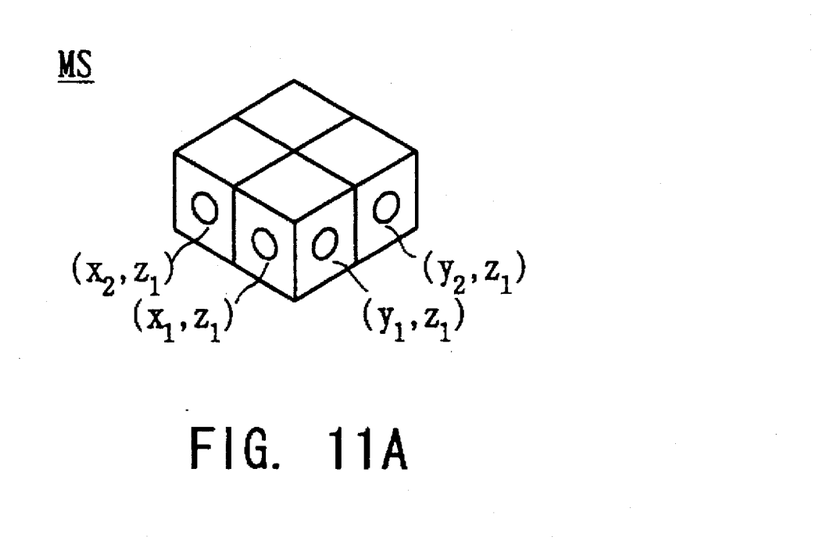
FIGS. 11A and 11B are schematic perspective diagrams explaining the case where the positions of the input and output terminals are virtually allotted to other terminal positions in the same layer level.
Figure 11B:
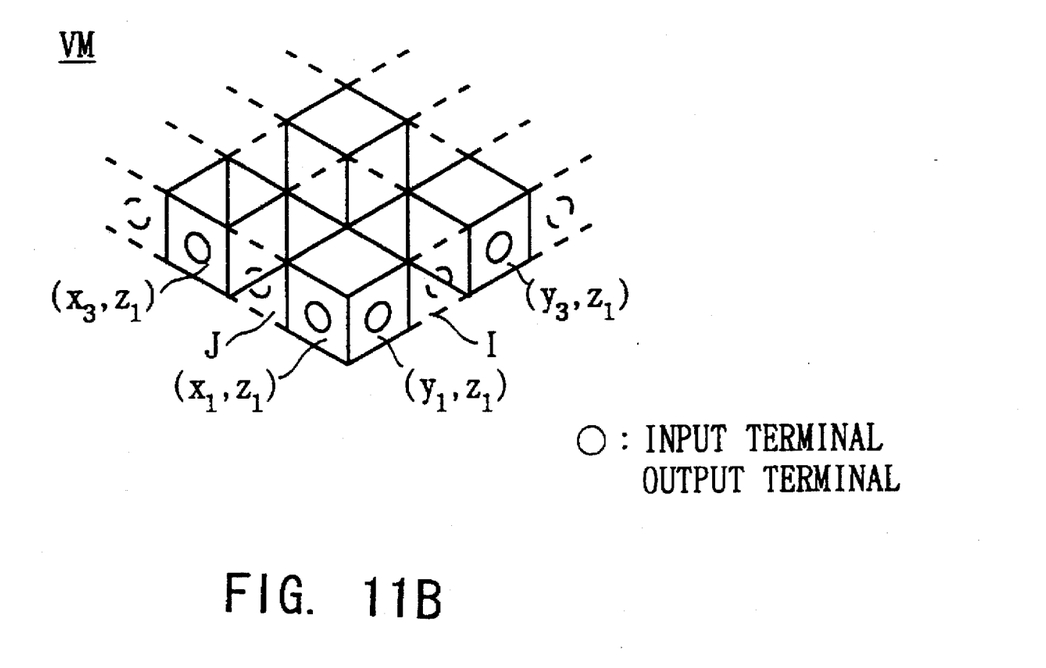

Further, when this conversion function is employed, the allotment of the terminals of the physically existing matrix switcher to the terminals of the virtual matrix switcher can be changed in the same layer level of the virtual matrix switcher. For example, the input terminals $(y_1, z_1)$, $(y_2, z_1)$ and the output terminals $(x_1, z_1)$, $(x_2, z_1)$ of the matrix switcher MS arranged to be adjacent to each other as shown in FIG. 11A may be made so as to correspond with the input terminals $(Y_1, Z_1)$, $(Y_3, Z_1)$ and the output terminals $(X_1, Z_1)$, $(X_3, Z_1)$ of the virtual matrix switcher which are arranged on every other one as shown in FIG. 11B.

With this arrangement, the terminals of the virtual matrix switcher can be treated as if an input terminal "I" exists between the input terminals $(Y_1, Z_1)$ and $(Y_3, Z_1)$, and as if an output terminal "J" exists between the output terminals $(X_1, Z_1)$ and $(X_3, Z_1)$. When such a terminal allocation function is used, terminals of the physically existing matrix switcher can be freely allotted to the arbitrary terminals of the virtual matrix switcher in accordance with the system arrangement.

For example, when the system is constituted by piling two matrix switchers, that is, a matrix switcher having sixty-four input terminals and sixty-four output terminals for a video signal and another matrix switcher having thirty-two input terminals and thirty-two output terminals for an audio signal, the input and output terminals of the matrix switcher for audio signals can be easily allotted to the input and output terminals for video signals with audio signals on a virtual matrix space in a manner that the input and output terminals of the matrix switcher for audio signals are paired with the input and output terminals for video signals with audio signals on the virtual matrix space.

As a result, unlike the conventional system, it is not necessary to physically allot the input and output terminals for video signals with audio signals to thirty-two pairs of continuous terminals, and hence the operability of the system can be improved.

Further, even if it becomes necessary to change the terminals to or from which video signals with audio signals are inputted/outputted, the terminals to which audio signals are inputted can be easily changed on the virtual matrix switcher. Accordingly, it is not necessary to prepare a matrix switcher having sixty-four input terminals and sixty-four output terminals at the maximum as audio matrix switcher only for the purpose of widening the selection range or improving the degree of freedom of the terminal arrangement. As a result, the audio matrix switcher can be improved in its efficiency of terminal utilization.

According to thus constructed system of the embodiment, the crosspoints on the virtual matrix space having a relationship logically corresponding to the physically existing crosspoints are displayed on the control panel 3, so that the user can switch the crosspoints of the matrix switchers without being conscious of the physically existing crosspoints. As a consequence, the operability of the system can be improved for the user.

Further, since the user can arbitrarily combine or switch the crosspoints on a virtual matrix space, the selection range or the degree of freedom of the terminal arrangement can be widened or improved. As a result, it becomes unnecessary to prepare a matrix switcher having a scale larger than that required, and so the terminals and crosspoints of a matrix switcher can be used usefully and effectively.

(4) Other embodiments

In the embodiment described above, the matrix switcher system 1 is constituted by two matrix switchers. However, the present invention is not only limited to this, but the matrix switcher system may be constituted by one matrix switcher or by three or more matrix switchers. Further, while the matrix switcher system 1 is constituted by one control panel in the aforesaid embodiment, two or more control panels may be used. The control panel used in the present invention may be a remote controller.

Further, in the embodiment described above, the system configuration management unit 5 for managing the relation of correspondence between the crosspoints of the physical matrix switcher and the crosspoints of the virtual matrix switcher is prepared as a hardware separately from the system controller 4. However, the present invention is not only limited to this, but the system configuration management unit 5 may be provided as a software within the system controller 4. Alternatively, the system configuration management unit 5 may be provided as a hardware as well as a software.

Further, in the embodiment described above, the system controller 4 is provided as a hardware. However, the present invention is not only limited to this, but the function of the system controller 4 may be prepared both as a software and as a hardware.

Furthermore, in the embodiment described above, the matrix switcher switches inputs/outputs of a plurality of video signals or a plurality of audio signals. However, the present invention is not only limited to this, but also can be applied to the case where the matrix switcher switches control signals such as time codes or the like. Further, the present invention is widely applicable to a case where the matrix switcher switches inputs/outputs of a plurality of signals with different characteristics.

As described above, according to the present invention, since the connection state of the Physically-existing matrix switcher means can be managed in a virtual connection state, the input/output switching apparatus and the matrix switcher control apparatus can be realized which are constructed more flexibly as compared with the conventional systems.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An input/output switching apparatus, comprising:

a plurality of matrix switchers each including a plurality of input terminals and output terminals;

virtual information inputting means for inputting virtual partitioning information, virtual input information, and virtual output information, said virtual partitioning information identifying selected virtual matrix switchers, said virtual input information identifying a selected virtual input terminal, and said virtual output information identifying a selected virtual output terminal; and conversion means for converting said virtual partitioning information, said virtual input information, and said virtual output information into physical matrix selection information, physical input information, and physical output information, respectively, said physical matrix selection information identifying a selected one of said matrix switchers, and said physical input information and said physical output information identifying selected input and output terminals, respectively, of the selected matrix switcher;

wherein the selected matrix switcher switches the selected input terminals and output terminals of the selected matrix switcher in accordance with said physical input information and said physical output information.

2. The input/output switching apparatus according to claim 1, wherein said conversion means includes a first conversion table for converting said virtual input information and said virtual partitioning information into physical input information and first physical matrix selection information; and a second conversion table for converting said virtual output information and said virtual partitioning information into physical output information and second physical matrix selection information.

3. The input/output switching apparatus according to claim 2, wherein said conversion means supplies said physical matrix selection information, said physical input information, and said physical output information to said plurality of matrix switchers only when the first physical matrix selection information obtained by said first conversion table corresponds with the second physical matrix selection information obtained by said second conversion table.

4. The input/output switching apparatus according to claim 1, wherein said conversion means and one of said plurality of matrix switchers are constructed as one apparatus.

5. The input/output switching apparatus according to claim 1, wherein said virtual partitioning information, said virtual input information, and said virtual output information represent coordinates of a three-dimensional virtual switching matrix in which said virtual partitioning information in conjuction with said virtual input information represent a designated virtual input terminal of said three-dimensional virtual switching matrix, and said virtual partitioning information in conjuction with said virtual output information represent a designated virtual output terminal of said three-dimensional virtual switching matrix.

6. A matrix switcher control apparatus, comprising:

a first conversion table for converting virtual partitioning information identifying selected virtual matrix switchers and virtual input information identifying a selected virtual input terminal into physical matrix selection information and physical input information, said physical matrix selection information identifying a selected one of said matrix switchers, and said physical input information identifying a selected input terminal of the selected matrix switcher;

a second conversion table for converting said virtual partitioning information and virtual output information identifying a selected virtual output terminal into said physical matrix selection information and physical output information, said physical output information identifying a selected output terminal of the selected matrix switcher; and control means for supplying said physical matrix selection information, said physical input information, and said physical output information obtained from said first conversion table and said second conversion table to a plurality of matrix switchers which include respective input and output terminals, which respectively store different physical matrix selection information, and which couple selected input and output terminals thereof in accordance with said matrix selection information, said physical input information and said physical output information.

7. The matrix switcher control apparatus according to claim 6, wherein said control means supplies said physical matrix selection information, said physical input information, and said physical output information to said plurality of matrix switchers only when said physical matrix selection information obtained by said first conversion table corresponds with said physical matrix selection information obtained by said second conversion table.

* * * * *